(12) United States Patent
Takeda et al.

(10) Patent No.: US 11,785,459 B2
(45) Date of Patent: *Oct. 10, 2023

(54) MARINE VESSEL PORTABLE DEVICE REGISTRATION SYSTEM AND MARINE VESSEL PORTABLE DEVICE REGISTRATION METHOD

(71) Applicant: YAMAHA HATSUDOKI KABUSHIKI KAISHA, Iwata (JP)

(72) Inventors: Kentaro Takeda, Shizuoka (JP); Naoju Takano, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 100 days.

This patent is subject to a terminal disclaimer.

(21) Appl. No.: 17/740,805

(22) Filed: May 10, 2022

(65) Prior Publication Data
US 2022/0272535 A1    Aug. 25, 2022

Related U.S. Application Data

(63) Continuation of application No. 16/731,129, filed on Dec. 31, 2019, now Pat. No. 11,363,456.

(30) Foreign Application Priority Data

Jan. 8, 2019 (JP) .............................. JP2019-001459

(51) Int. Cl.
*H04L 29/06* (2006.01)
*H04W 12/06* (2021.01)
*H04W 12/37* (2021.01)

(52) U.S. Cl.
CPC ........... *H04W 12/06* (2013.01); *H04W 12/37* (2021.01)

(58) Field of Classification Search
CPC ....... H04W 12/06; H04W 12/37; G08C 17/02
See application file for complete search history.

(56) References Cited

U.S. PATENT DOCUMENTS

| | | | |
|---|---|---|---|
| 7,260,616 B1 * | 8/2007 | Cook | H04L 63/10 370/316 |
| 11,122,038 B1 * | 9/2021 | Schuster | H04W 12/66 |
| 2011/0028126 A1 * | 2/2011 | Lim | H04W 12/06 455/411 |
| 2019/0149987 A1 * | 5/2019 | Moore | H04W 12/08 726/9 |
| 2019/0230079 A1 * | 7/2019 | Chung | H04L 63/0884 |

FOREIGN PATENT DOCUMENTS

WO    WO-2010011023 A1 *    1/2010    ............ H04W 12/06

OTHER PUBLICATIONS

Takeda et al., "Marine Vessel Portable Device Registration System and Marine Vessel Portable Device Registration Method", U.S. Appl. No. 16/731,129, filed Dec. 31, 2019.

* cited by examiner

*Primary Examiner* — Ka Shan Choy
(74) *Attorney, Agent, or Firm* — Keating and Bennett, LLP

(57) ABSTRACT

A marine vessel portable device registration system includes portable devices and a controller. A registered portable device transmits a specific wireless signal based on an input operation on a portable device operator. The controller is configured or programmed to receive the specific wireless signal from the registered portable device, and perform a control to authenticate and register an unregistered portable device as a new registered portable device based on having received a wireless signal from the unregistered portable device.

16 Claims, 8 Drawing Sheets

FIG.12 START OF PORTABLE DEVICE REGISTRATION MODE USING REGISTERED PORTABLE DEVICE

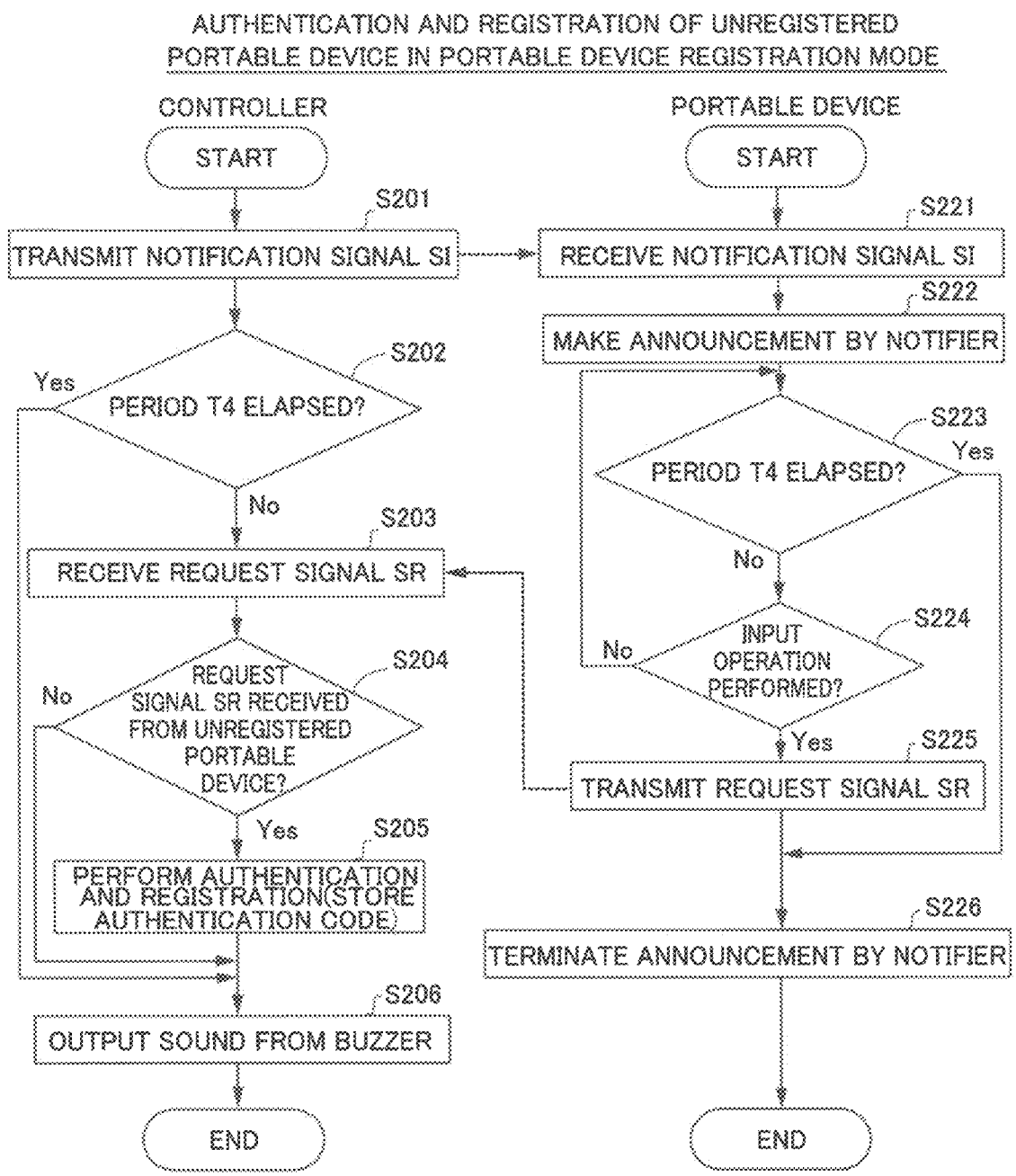

MARINE VESSEL PORTABLE DEVICE REGISTRATION SYSTEM AND MARINE VESSEL PORTABLE DEVICE REGISTRATION METHOD

CROSS REFERENCE TO RELATED APPLICATIONS

This application claims the benefit of priority to Japanese Patent Application No. 2019-001459 filed on Jan. 8, 2019. The entire contents of this application are hereby incorporated herein by reference.

BACKGROUND OF THE INVENTION

1. Field of the Invention

The present invention relates to a marine vessel portable device registration system and a marine vessel portable device registration method.

2. Description of the Related Art

A marine vessel portable device registration system that authenticates and registers a new portable device and a marine vessel portable device registration method for authenticating and registering a new portable device are known in general. Such a marine vessel portable device registration system is disclosed in Japanese Patent Laid-Open No. 2005-269472, for example.

Japanese Patent Laid-Open No. 2005-269472 discloses a controller for a small marine vessel including a main body device provided together with a target to be controlled and a portable device, and that registers an authentication code for a new portable device. This controller performs authentication by wireless communication between the main body device and the portable device. Moreover, the main body device is attached to a front wall of an engine room inside a hull of the small marine vessel. When a new portable device is additionally registered, a re-registration device separate from the main body device and the portable device is prepared. After a lid of the hull is opened by an operator, an inspection lid is opened by the operator in order to open the engine room in the hull. Thereafter, a connector of the re-registration device and a connector of the main body device are connected by the operator. Then, a lock button or an unlock button of the new portable device is pressed in a state in which the connector of the re-registration device and the connector of the main body device are connected such that the controller registers an authentication code for the new portable device.

However, in the controller for a small marine vessel disclosed in Japanese Patent Laid-Open No. 2005-269472, the operator needs to open the lid of the hull, open the inspection lid inside the hull, connect the connector of the re-registration device to the connector of the main body device, and operate the new portable device in order to additionally register the authentication code for the new portable device. Therefore, a marine vessel portable device registration system and a marine vessel portable device registration method that reduce the work burden of additionally registering (authenticating and registering) a new portable device are desired.

SUMMARY OF THE INVENTION

Preferred embodiments of the present invention provide marine vessel portable device registration systems and marine vessel portable device registration methods that reduce the work burden of authenticating and registering a new portable device.

A marine vessel portable device registration system according to a preferred embodiment of the present invention includes a plurality of portable devices each including a portable device operator and that transmit an authentication signal that is a wireless signal, and a controller disposed on a marine vessel and configured or programmed to receive the authentication signal from any of the plurality of portable devices and perform an authentication control process related to control of the marine vessel based on the authentication signal that has been received. A registered portable device, which is a portable device that has been authenticated and registered by the controller among the plurality of portable devices, transmits a specific wireless signal based on an input operation on the portable device operator, and the controller is configured or programmed to receive the specific wireless signal from the registered portable device, and perform a control to authenticate and register an unregistered portable device that is a portable device other than the registered portable device among the plurality of portable devices, the unregistered portable device corresponding to the wireless signal that has been received, as a new registered portable device based on having received the wireless signal from the unregistered portable device.

In a marine vessel portable device registration system according to a preferred embodiment of the present invention, the registered portable device transmits the specific wireless signal based on an input operation on the portable device operator. Furthermore, the controller is configured or programmed to receive the specific wireless signal from the registered portable device and perform a control to authenticate and register the unregistered portable device corresponding to the wireless signal that has been received as the new registered portable device based on having received the wireless signal from the unregistered portable device. Accordingly, even when the controller is attached to the inside of a hull of the marine vessel, the unregistered portable device is able to be authenticated and registered as the new registered portable device by performing an input operation on the registered portable device without opening an inner portion of the hull of the marine vessel and connecting a connector of a re-registration device to a connector of a main body device. Consequently, the work burden of authenticating and registering a new portable device is reduced. Furthermore, when the specific wireless signal is received from the registered portable device, the authentication and registration are performed such that the security at the time of the authentication and registration is improved as compared with the case in which the controller is constantly in a state in which the authentication and registration are possible. Consequently, when a new portable device is authenticated and registered while the security is improved, the work burden of authenticating and registering a new portable device is reduced as compared with the case in which a re-registration device is prepared and a connector of the re-registration device is connected to a connector of the controller.

In a marine vessel portable device registration system according to a preferred embodiment of the present invention, the registered portable device preferably transmits a lock signal, which is the wireless signal for the controller to perform a lock control to lock at least a portion of the marine vessel, to the controller based on an input operation on the portable device operator, and transmits an unlock signal, which is the wireless signal for the controller to perform an unlock control to unlock the lock control, to the controller based on another input operation on the portable device operator, and the controller is preferably configured or programmed to perform a control to receive a signal based on a combination of the lock signal and the unlock signal from the registered portable device as the specific wireless signal. Accordingly, it is not necessary to add a structure that transmits a dedicated signal for authentication and registration separate from the lock signal and the unlock signal to the portable device that transmits the lock signal and the unlock signal, and thus a complex structure of the portable device is prevented.

In such a case, the portable device operator of the registered portable device preferably includes a lock operator and an unlock operator separate from each other, the registered portable device preferably alternately transmits the lock signal and the unlock signal to the controller based on having alternately performed an input operation on the lock operator and the unlock operator, and the controller is preferably configured or programmed to perform a control to determine, after having alternately received the lock signal and the unlock signal from the registered portable device, that the specific wireless signal has been received. When an input operation is sequentially performed once on the lock operator and the unlock operator, the marine vessel operator who intends to perform the lock control or the unlock control may conceivably perform the input operation sequentially performed once on the lock operator and the unlock operator as a general input operation. On the other hand, when an input operation is alternately performed on the lock operator and the unlock operator, the marine vessel operator who intends to perform the lock control or the unlock control may conceivably perform the input operation alternately performed on the lock operator and the unlock operator not as a general input operation but as a special input operation (specific input operation). In view of this, according to preferred embodiments of the present invention, having alternately received the lock signal and the unlock signal is determined as having received the specific wireless signal, and thus when the marine vessel operator intends to perform the lock control or the unlock control and does not intend to authenticate and register the unregistered portable device, the controller is prevented from performing the control of determining that the specific wireless signal has been received. Furthermore, a period is required for the marine vessel operator to alternately move his or her finger between the lock operator and the unlock operator in order to alternately transmit the lock signal and the unlock signal. Thus, as compared with the case in which the marine vessel operator continuously performs an input operation a plurality of times on the lock operator or the unlock operator without reciprocating his or her finger, the period is required for the marine vessel operator to alternately move his or her finger, and thus the controller easily distinguishes each input operation.

In a marine vessel portable device registration system including the registered portable device that includes the lock operator and the unlock operator, the controller is preferably configured or programmed to perform a control to determine, after having alternately received the lock signal and the unlock signal a plurality of times from the registered portable device, that the specific wireless signal has been received. Accordingly, as compared with the case in which having alternately received the lock signal and the unlock signal once is determined as having received the specific wireless signal, a control to authenticate and register the unregistered portable device is further prevented from being performed when authentication and registration of the unregistered portable device are not intended.

In a marine vessel portable device registration system according to a preferred embodiment of the present invention, the controller is preferably configured or programmed to perform a control to start a portable device registration mode in which the unregistered portable device is newly authenticated and registered based on having received the specific wireless signal from the registered portable device, and perform a control to authenticate and register the unregistered portable device corresponding to the wireless signal that has been received as the new registered portable device based on having received the wireless signal from the unregistered portable device during a period during which the portable device registration mode is executed. Accordingly, the control to authenticate and register the unregistered portable device as the new registered portable device is performed during the period during which the portable device registration mode separate from a normal mode (a mode in which the authentication control process is performed) is executed, and thus the unregistered portable device is prevented from being authenticated and registered as the new registered portable device during a period during which the normal mode is executed.

In such a case, the controller preferably includes a main power supply switch and a main power supply relay, and is preferably configured or programmed to transmit an authentication confirmation signal to the registered portable device based on an input operation on the main power supply switch, the registered portable device preferably transmits an unlock signal, which is the wireless signal for the controller to perform an unlock control to unlock the lock control, to the controller in response to acquiring the authentication confirmation signal, and the controller is preferably configured or programmed to perform a control to start the portable device registration mode after a time at which the unlock control is started by receiving the unlock signal from the registered portable device and when the specific wireless signal is received from the registered portable device in a state in which the main power supply relay is driven. Accordingly, an operation of authenticating and registering the unregistered portable device as the new registered portable device is performed in a state in which the marine vessel operator performs an input operation on the main power supply switch and performs an operation on the marine vessel (a state in which the lock is released). Thus, the unregistered portable device is prevented from being authenticated and registered as the new registered portable device at a time at which the marine vessel operator does not intend to operate the marine vessel and to authenticate and register the unregistered portable device. Furthermore, generally, in a state in which the main power supply relay is driven, the operation (switching between the lock control and the unlock control, for example) of the controller based on an operation on the portable device is disabled. In view of this, according to preferred embodiments of the present invention, a control to start the portable device registration mode is performed in a state in which the main power supply relay is driven such that the operation (switching between the lock control and the unlock control, for example) of the controller not intended by the marine vessel operator other than the start of the portable device registration mode is prevented from being performed based on the specific wireless signal from the registered portable device.

In a marine vessel portable device registration system including the controller that includes the main power supply switch, the controller is preferably configured or programmed to perform a control to start the portable device registration mode when the specific wireless signal is received within a predetermined period from the time at which the unlock control is started. Accordingly, a period in which the portable device registration mode is started is limited to the predetermined period, and thus the portable device registration mode is prevented from being started in a period other than the predetermined period, which is not intended by a marine vessel operator.

In a marine vessel portable device registration system including the controller configured or programmed to execute the portable device registration mode, the plurality of portable devices each preferably include a notifier that makes an announcement by outputting a sound or light, the controller is preferably configured or programmed to transmit a notification signal to each of the plurality of portable devices when the portable device registration mode is started, and the notifier of each of the plurality of portable devices preferably makes the announcement indicating that the notification signal has been received upon receiving the notification signal. Accordingly, the marine vessel operator is notified that each of the portable devices has received the notification signal, and thus the convenience of authentication and registration is improved.

In such a case, the plurality of portable devices each preferably include a light emitter as the notifier, and the plurality of portable devices each preferably output light from the light emitter upon receiving the notification signal. Accordingly, the marine vessel operator visually recognizes that the portable devices each have received the notification signal from the light emitter provided in each of the portable devices. Consequently, the convenience of authentication and registration is further improved.

In a marine vessel portable device registration system including the controller configured or programmed to transmit the notification signal, the unregistered portable device preferably transmits a request signal, which is the wireless signal to request authentication and registration, to the controller based on an input operation on the portable device operator upon receiving the notification signal, and the controller is preferably configured or programmed to perform a control to authenticate and register the unregistered portable device corresponding to the request signal as the new registered portable device based on having received the request signal from the unregistered portable device after transmitting the notification signal. Accordingly, the request signal is transmitted based on having received the notification signal and the input operation on the portable device operator, and thus the unregistered portable device intended for authentication and registration by the marine vessel operator is easily identified from the plurality of portable devices by receiving the request signal.

In such a case, the portable device operator of the unregistered portable device preferably includes a lock operator and an unlock operator separate from each other, and the unregistered portable device preferably transmits the request signal to the controller based on an input operation on any of the lock operator and the unlock operator upon receiving the notification signal. Accordingly, the request signal is transmitted to the controller based on the input operation on any of the lock operator and the unlock operator without providing a dedicated operator to transmit the request signal to the controller. Consequently, the request signal is transmitted while a complex structure of the portable device is prevented. Furthermore, the unregistered portable device transmits the request signal to the controller based on the input operation on any of the lock operator and the unlock operator, and thus an input operation performed by the marine vessel operator to transmit the request signal is simplified.

In a marine vessel portable device registration system including the controller configured or programmed to start the portable device registration mode based on having received the specific wireless signal, the controller is preferably configured or programmed to perform a control to authenticate and register the new registered portable device based on having received the wireless signal from the unregistered portable device during the period during which the portable device registration mode is executed and performs a control to end the portable device registration mode, and the controller is preferably configured or programmed to perform a control to end the portable device registration mode without performing a control to authenticate and register the new registered portable device based on having received the wireless signal from the registered portable device during the period during which the portable device registration mode is executed, or based on that the period during which the portable device registration mode is executed has elapsed. Accordingly, the new registered portable device is authenticated and registered, the wireless signal is transmitted from the registered portable device to the controller, or the period during which the portable device registration mode is executed elapses such that the portable device registration mode is ended.

In a marine vessel portable device registration system including the controller configured or programmed to execute the portable device registration mode, the controller preferably includes a password operator that receives an operation of entering a password, and the controller is preferably configured or programmed to perform a control to start the portable device registration mode when the password corresponding to a preset password is entered through the password operator. Accordingly, even when the specific wireless signal is not received from the registered portable device, the controller starts the portable device registration mode while the security is enhanced with the password. That is, even when all registered portable devices are lost, or even when the registered portable devices are disposed at a location (such as on land) at which wireless communication with the controller of the marine vessel located on the water is not possible, the password is entered into the password operator such that the unregistered portable device is newly authenticated and registered as the registered portable device while the security is enhanced. Furthermore, even when all the registered portable devices are lost, it is not necessary to replace the controller.

In such a case, the controller is preferably configured or programmed to perform a control to start a password entry mode in which the password entered into the password operator is acquired based on a predetermined input operation on the password operator, and perform a control to start the portable device registration mode when the password corresponding to the preset password is entered into the password operator during a period during which the password entry mode is executed. Accordingly, the password is prevented from being entered during a period during which the password entry mode is not executed and when the marine vessel operator does not intend to enter the password. Furthermore, it is not necessary to provide a password operator separately from the main power supply switch.

In a marine vessel portable device registration system including the controller configured or programmed to execute the password entry mode, the password operator preferably includes a main power supply switch of the controller, and the controller is preferably configured or programmed to perform a control to start the password entry mode based on an intermittent input operation on the main power supply switch. Accordingly, the main power supply switch is used as a password operator, and thus it is not necessary to provide a password operator separately from the main power supply switch. Consequently, the controller starts the password entry mode while a complex structure of the controller is significantly reduced or prevented.

In a marine vessel portable device registration system including the controller that includes the password operator, the password operator preferably includes a main power supply switch of the controller, and the controller preferably includes a controller sound output that outputs a sound, and is preferably configured or programmed to acquire the password corresponding to an input operation on the main power supply switch corresponding to a type of the sound output from the controller sound output. Accordingly, different words (codes) defining different types of sounds are entered into one main power supply switch, and thus an increase in the number of password operators (switches) is prevented.

A marine vessel portable device registration method for authenticating and registering a new portable device according to a preferred embodiment of the present invention includes performing an authentication control process related to control of a marine vessel based on an authentication signal, which is a wireless signal received from a portable device, receiving a specific wireless signal based on an input operation on a portable device operator of a registered portable device, which is the portable device that has been authenticated and registered, from the registered portable device, then receiving the wireless signal from an unregistered portable device, which is the portable device other than the registered portable device among a plurality of portable devices, and then authenticating and registering the unregistered portable device corresponding to the wireless signal that has been received as a new registered portable device.

In a marine vessel portable device registration method according to a preferred embodiment of the present invention, the work burden of authenticating and registering a new portable device is reduced when the new portable device is authenticated and registered. Furthermore, in a marine vessel portable device registration method according to a preferred embodiment of the present invention, the security is improved.

In a marine vessel portable device registration method according to a preferred embodiment of the present invention, the step of receiving the specific wireless signal preferably includes receiving a signal based on a combination of a lock signal, which is the wireless signal to perform a lock control to lock at least a portion of the marine vessel, and an unlock signal, which is the wireless signal to perform an unlock control to unlock the lock control, as the specific wireless signal. Accordingly, it is not necessary to add a structure that transmits a dedicated signal for authentication and registration separate from the lock signal and the unlock signal to the portable device that transmits the lock signal and the unlock signal, and thus a complex structure of the portable device is prevented.

In such a case, the portable device operator of the registered portable device preferably includes a lock operator and an unlock operator separate from each other, and the receiving of the specific wireless signal preferably includes determining, after having alternately received the lock signal and the unlock signal from the registered portable device based on having alternately performed an input operation on the lock operator and the unlock operator, that the specific wireless signal has been received. Accordingly, when the marine vessel operator intends to perform the lock control or the unlock control and does not intend to authenticate and register the unregistered portable device, authentication and registration of the unregistered portable device is prevented. Furthermore, as compared with the case in which the marine vessel operator continuously performs an input operation a plurality of times on the lock operator or the unlock operator without alternately moving his or her finger between the lock operator and the unlock operator, a period is required for the marine vessel operator to alternately move his or her finger between the lock operator and the unlock operator, and thus each input operation is easily distinguished.

A marine vessel portable device registration method according to a preferred embodiment of the present invention preferably further includes receiving an operation of entering a password prior to the receiving of the wireless signal from the unregistered portable device, and the receiving of the wireless signal from the unregistered portable device preferably includes receiving the wireless signal from the unregistered portable device when the password that has been entered corresponds to a preset password. Accordingly, even when the specific wireless signal is not received from the registered portable device, a portable device registration mode is started while the security is enhanced with the password.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 14 is a diagram (flowchart) illustrating authentication and registration of an unregistered portable device in a portable device registration mode according to a preferred embodiment of the present invention.

DETAILED DESCRIPTION OF THE PREFERRED EMBODIMENTS

Preferred embodiments of the present invention are hereinafter described with reference to the drawings.

The structure of a marine vessel control system 100 (hereinafter referred to as a "system 100") according to preferred embodiments of the present invention is now described with reference to FIGS. 1 to 11. The marine vessel control system is an example of a "portable device registration system for a marine vessel".

Figure 1:
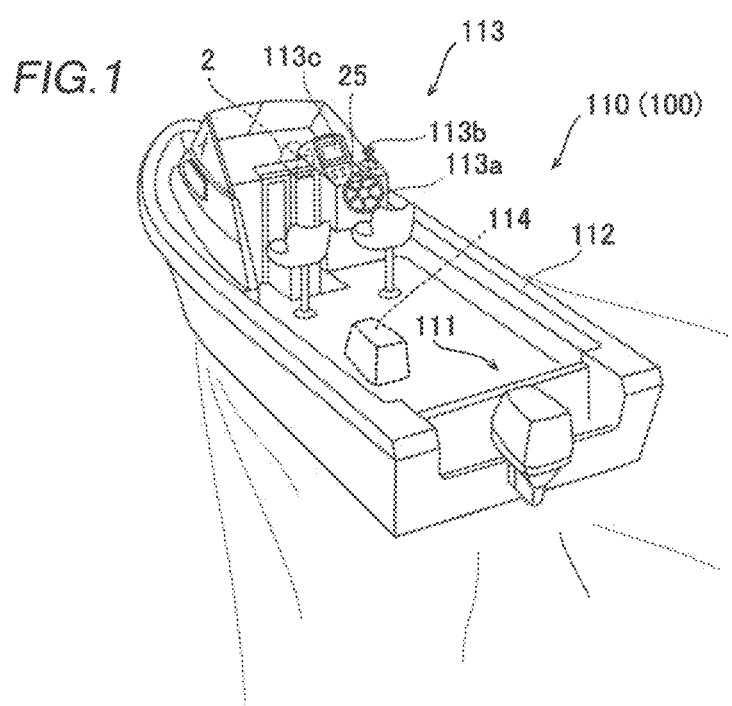
FIG. 1 is a perspective view showing the overall structure of a marine vessel according to a preferred embodiment of the present invention.

The system 100 according to a preferred embodiment of the present invention controls a marine vessel 110 shown in FIG. 1. The marine vessel 110 is a small marine vessel, for example, and is an outboard motor boat including an outboard motor 111.

The marine vessel 110 includes a hull 112, a marine vessel operation unit 113, and a battery 114. The outboard motor 111 is attached to a rear portion of the hull 112. The marine vessel operation unit 113 includes a steering wheel 113a and a remote control 113b through which a marine vessel operator operates the outboard motor 111 while being located on an operation seat (cockpit), and an indicator 113c that indicates the rotational speed of an engine 111a of the outboard motor 111, for example. In other words, the marine vessel operation unit 113 is a console. In FIG. 1, the marine vessel operator is not shown.

Figure 2:
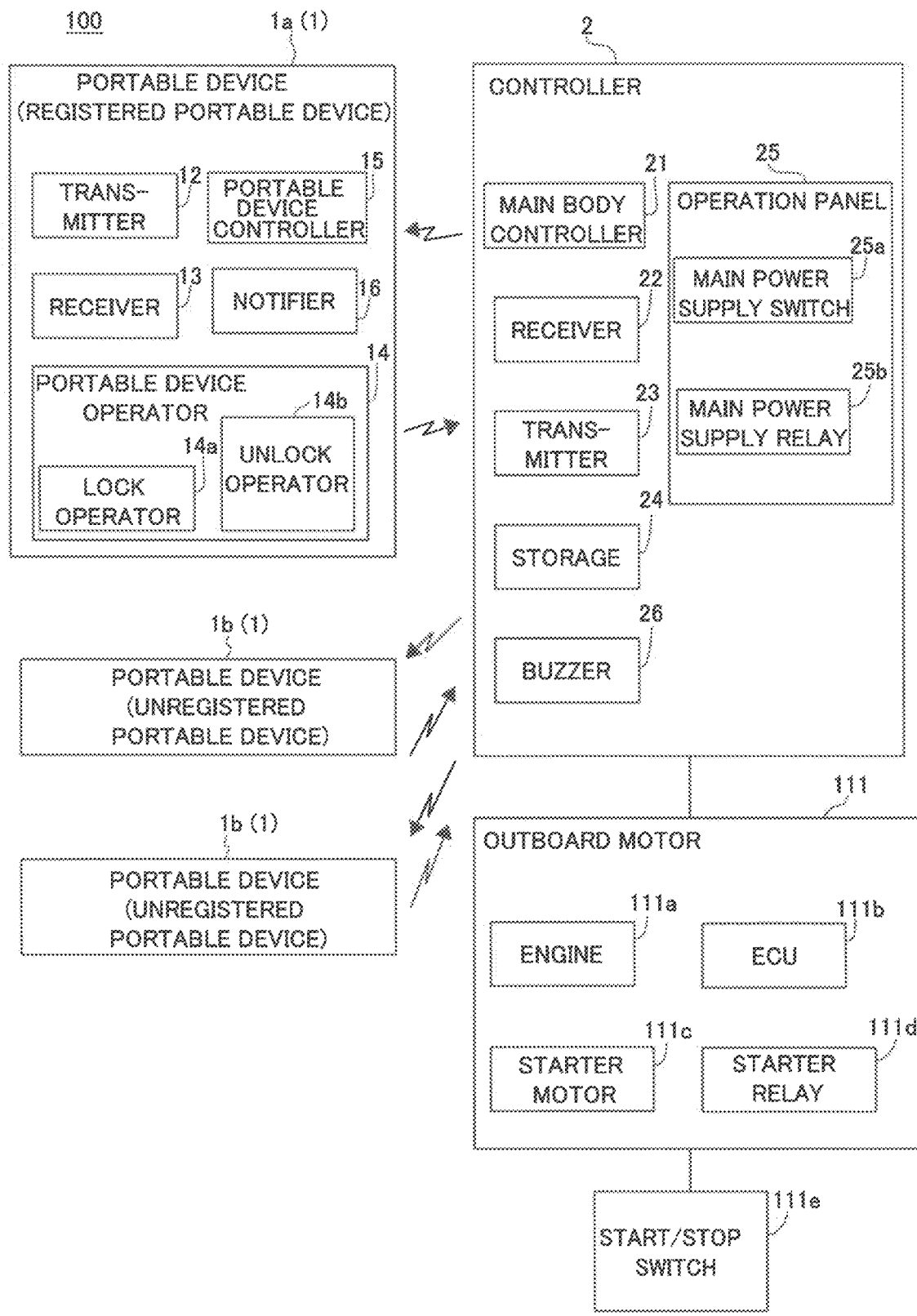
FIG. 2 is a block diagram showing the structure of a marine vessel control system according to a preferred embodiment of the present invention.

As shown in FIG. 2, the system 100 includes a plurality of portable devices 1 and a controller 2. The portable devices 1 transmit authentication signals SA, which are wireless signals that perform authentication. The controller 2 is disposed on the marine vessel 110. The controller 2 receives the authentication signals SA from the portable devices 1, and performs an authentication control process related to control of the marine vessel 110 based on the received authentication signals SA. That is, the system 100 is an authentication control system (antitheft system) that performs the authentication control process related to control of the marine vessel 110 due to wireless communication between the portable devices 1 and the controller 2. The system 100 is a keyless entry system or smart key system that does not include a mechanical key.

The system 100 includes an engine control unit 111b (hereinafter referred to as an "ECU 111b") that controls the engine 111a of the outboard motor 111. The ECU 111b is connected to the controller 2. The ECU 111b and the controller 2 are connected to each other such that controller area network (CAN) communication therebetween is possible, for example. The system 100 also includes a starter relay 111d and a start/stop switch 111e. The starter relay 111d is provided in the outboard motor 111. The start/stop switch 111e is connected to the outboard motor 111.

Figure 3:
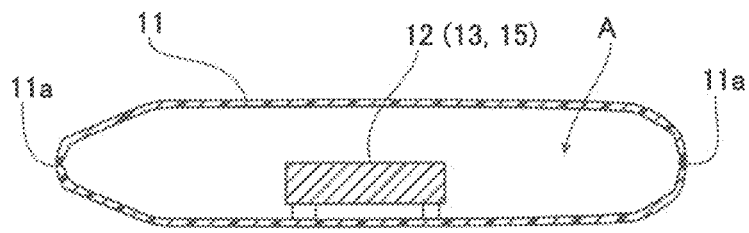
FIG. 3 is a schematic sectional view of a portable device according to a preferred embodiment of the present invention.
Figure 4:
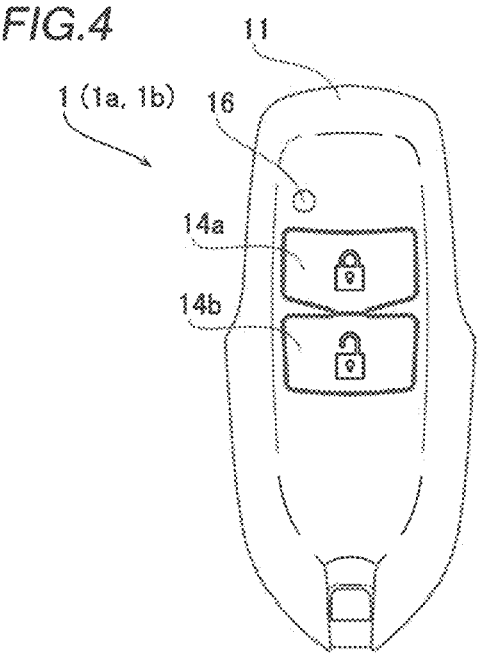
FIG. 4 is a plan view of a portable device according to a preferred embodiment of the present invention.

As shown in FIGS. 2 and 3, the portable devices 1 each include a portable device case 11, a transmitter 12, a receiver 13, a portable device operator 14, a portable device controller 15, and a notifier 16. The portable device case 11 is sealed (made liquid-tight) by a seal 11a. When the portable device case 11 is placed in water, the portable device 1 floats on the water surface due to a buoyancy force generated due to an internal space A (air). The transmitter 12, the receiver 13, and the portable device controller 15 are disposed inside the portable device case 11. As shown in FIG. 4, the portable device case 11 preferably is substantially oval or substantially rectangular in a plan view, for example, and the marine vessel operator is able to grip the portable device case 11. The marine vessel operator is able to visually recognize the notifier 16 from the outside of the portable device case 11.

The transmitter 12 includes a communication antenna that transmits an ultra-high frequency (UHF) wireless signal, for example. The transmitter 12 transmits the authentication signal SA, which is a wireless signal including an authentication code C (ID information, for example) that differs for each portable device 1, to the controller 2. The receiver 13 includes a communication antenna that receives a low frequency (LF) wireless signal, for example. The transmitter 12 and the receiver 13 transmit and receive wireless signals within a range (R1) having a radius of about 0.8 m, for example. Note that the range of transmission and reception is not limited to a radius of about 0.8 m, but the range of transmission and reception may be a radius of several meters or a radius of several tens of meters, for example, corresponding to the dimensions of the marine vessel 110 and/or a situation in which the authentication control process is used. Although the example in which the transmitter 12 transmits a UHF wireless signal and the receiver 13 receives an LF wireless signal has been described, the transmitter 12 and the receiver 13 are not limited to this example. For example, the transmitter 12 may transmit an LF wireless signal, and the receiver 13 may receive a UHF wireless signal.

As shown in FIG. 4, the portable device operator 14 includes a lock operator 14a and an unlock operator 14b provided separately from each other. Each of the lock operator 14a and the unlock operator 14b includes a push button switch provided on the portable device case 11, and receives a pressing force by the marine vessel operator as an input operation. The lock operator 14a and the unlock operator 14b are disposed adjacent to each other in the longitudinal direction of the portable device case 11. Thus, the marine vessel operator is able to alternately perform an input operation on the lock operator 14a and the unlock operator 14b of the portable device 1 by moving his or her finger while gripping the portable device case 11.

The portable device controller 15 includes a control circuit. The portable device controller 15 transmits a lock signal SL, which is a wireless signal for the controller 2 to perform a lock control to lock at least a portion of the marine vessel 110, to the controller 2 based on an input operation on the lock operator 14a. Furthermore, the portable device controller 15 transmits an unlock signal SU, which is a wireless signal for the controller 2 to perform an unlock control to unlock the lock control, to the controller 2 based on an input operation on the unlock operator 14b. That is, the portable device 1 transmits the lock signal SL to the controller 2 when the lock operator 14a is pressed, and transmits the unlock signal SU to the controller 2 when the unlock operator 14b is pressed. The lock signal SL and the unlock signal SU each include the authentication code C and are authentication signals SA. The "lock control" and the "unlock control" are described in detail below.

The notifier 16 outputs a sound or light based on a command from the portable device controller 15 so as to make an announcement. The portable device controller 15 controls the notifier 16 to make an announcement indicating that a notification signal SI described below has been received when the notification signal SI is received. The notifier 16 includes a light emitter that outputs light. For example, the notifier 16 includes a light emitting diode. The portable device controller 15 controls the notifier 16 to output light when the notification signal SI is received. That is, the announcement indicating that the notification signal SI has been received refers to turning on the notifier 16 (light emitting diode), for example. Moreover, the notifier 16 stops the announcement (turns off the light emitting diode) based on having ended a portable device registration mode described below. Specifically, the notifier 16 stops the announcement after a time at which the lock operator 14a is pressed and the lock signal SL is transmitted to the controller 2, after a time at which the unlock operator 14b is pressed and the unlock signal SU is transmitted to the controller 2, or after the elapse of a period T4 during which the portable device registration mode described below is executed.

As shown in FIG. 2, the controller 2 includes an immobilizer that performs the authentication control process. The controller 2 includes a main body controller 21, a receiver 22, a transmitter 23, a storage 24, an operation panel 25, and a buzzer 26. As shown in FIG. 1, the controller 2 (main body controller 21, the receiver 22, the transmitter 23, the storage 24, and the buzzer 26) is disposed inside the marine vessel operation unit 113 (console) of the marine vessel 110. The operation panel 25 is provided on the marine vessel operation unit 113. The operation panel 25 is operated by the marine vessel operator who operates the marine vessel operation unit 113. The buzzer 26 announces information to the marine vessel operator who operates the marine vessel operation unit 113. The buzzer 26 is an example of a "controller sound output".

The receiver 22 includes a communication antenna that receives an ultra-high frequency (UHF) wireless signal, for example. The receiver 22 receives the wireless signal from the portable device 1. The receiver 22 receives the lock signal SL including the authentication signal SA (authentication code C) and the unlock signal SU including the authentication signal SA (authentication code C) from the portable device 1. The transmitter 23 includes a communication antenna that transmits a low frequency (LF) wireless signal, for example. The transmitter 23 transmits an authentication confirmation signal SB and the notification signal SI to the portable device 1. Although the example in which the receiver 22 receives a UHF wireless signal and the transmitter 23 transmits an LF wireless signal has been described, the receiver 22 and the transmitter 23 are not limited to this example. For example, the receiver 22 may receive an LF wireless signal, and the transmitter 23 may transmit a UHF wireless signal.

The storage 24 stores an authentication code C, a password P described below, a control program, etc. Among the plurality of portable devices 1, a so-called authenticated and registered portable device 1, the authentication code C corresponding to which is stored in the storage 24 of the controller 2, is defined as a registered portable device 1a. Among the plurality of portable devices 1, a so-called unauthenticated and unregistered portable device 1, the authentication code C corresponding to which is not stored in the storage 24, other than the registered portable device 1a is defined as an unregistered portable device 1b. The registered portable device 1a is configured in the same manner as the unregistered portable device 1b, and is different from a so-called master key. Thus, as described below, even when all registered portable devices 1a are lost, for example, the unregistered portable device 1b is authenticated and registered such that the unregistered portable device 1b defines and functions as the registered portable device 1a.

Figure 5:
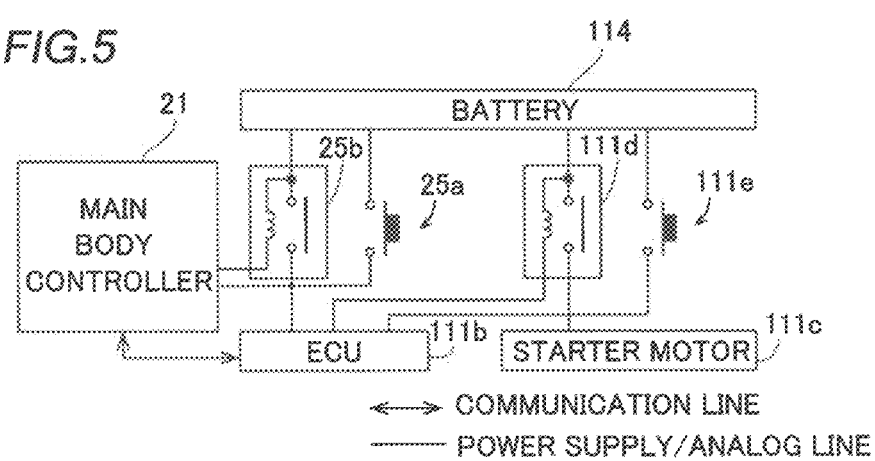
FIG. 5 is a diagram showing the structure regarding lock control and unlock control according to a preferred embodiment of the present invention.

As shown in FIGS. 2 and 5, the operation panel 25 includes a main power supply switch 25a and a main power supply relay 25b. The main power supply switch 25a is disposed between the battery 114 and the main body controller 21. The main power supply relay 25b includes a contact disposed between the battery 114 and the ECU 111b, and a coil disposed between the battery 114 and the main body controller 21. The main power supply switch 25a is an example of a "password operator".

As shown in FIG. 5, the start/stop switch 111e is disposed between the battery 114 and the ECU 111b. The starter relay 111d includes a contact disposed between the battery 114 and a starter motor 111c, and a coil disposed between the battery 114 and the ECU 111b.

The main body controller 21 collates the authentication code C of the lock signal SL or the unlock signal SU received from the portable device 1 with the authentication code C stored in the storage 24 as the authentication control process, for example. When the authentication code C received from the portable device 1 corresponds to the authentication code C stored in the storage 24, the main body controller 21 performs the lock control based on the lock signal SL, or performs the unlock control based on the unlock signal SU.

Specifically, the main body controller 21 transmits the authentication confirmation signal SB from the controller 2 to the portable device 1 when the main power supply relay 25b is not driven (off), the lock control is being performed, and the main power supply switch 25a is operated (pressed). The registered portable device 1a transmits the unlock signal SU to the controller 2 in response to acquiring the authentication confirmation signal SB. The main body controller 21 performs the unlock control based on the unlock signal SU, and performs a control to drive (turn on) the main power supply relay 25b. Furthermore, the main body controller 21 does not switch between the lock control and the unlock control during driving of the main power supply relay 25b.

When the main power supply relay 25b is not driven (off), the unlock control is being performed, and the main power supply switch 25a is operated, the main body controller 21 performs a control to drive (turn on) the main power supply relay 25b.

When the main power supply relay 25b is driven (on) and the main power supply switch 25a is operated, the main body controller 21 stops driving the main power supply relay 25b (turns off the main power supply relay 25b).

When the main power supply relay 25b is not driven (off), the lock control is being performed, and the main body controller 21 acquires the unlock signal SU based on an operation on the unlock operator 14b of the registered portable device 1a, the main body controller 21 switches control to be executed from the lock control to the unlock control.

When the main power supply relay 25b is not driven (off), the unlock control is being performed, and the main body controller 21 acquires the lock signal SL based on an operation on the lock operator 14a of the registered portable device 1a, the main body controller 21 switches control to be executed from the unlock control to the lock control.

The ECU 111b acquires information (authentication lock/unlock information) indicating whether the main body controller 21 is performing the lock control or the unlock control from the main body controller 21 by CAN communication. When the lock control is being performed by the main body controller 21 and an input operation is performed on the start/stop switch 111e, the ECU 111b does not drive the starter relay 111d, and does not allow a connection between the battery 114 and the starter motor 111c.

When the unlock control is being performed by the main body controller 21 and an input operation is performed on the start/stop switch 111e, the ECU 111b drives the starter relay 111d, and allows a connection between the battery 114 and the starter motor 111c. That is, only when the lock control is being performed, the start/stop switch 111e is turned on such that the engine 111a is started by the starter motor 111c.

The buzzer 26 outputs a sound to the marine vessel operator in response to a command from the main body controller 21.

Figure 6:
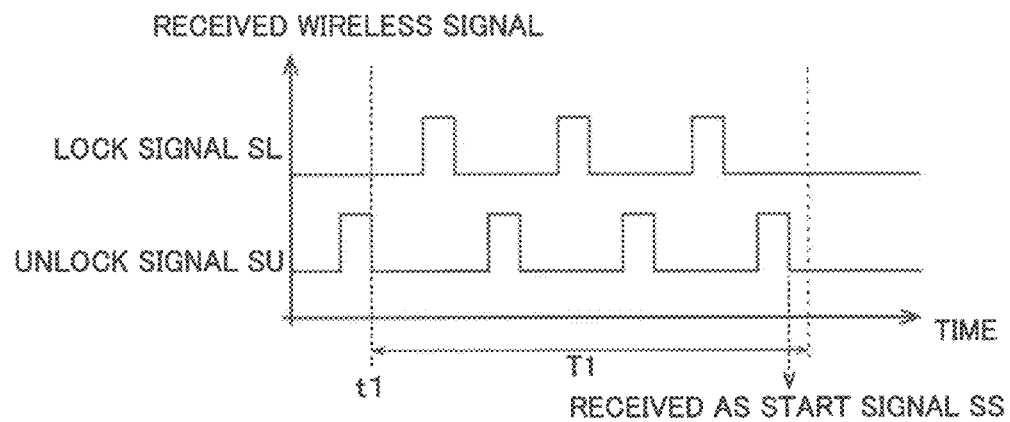
FIG. 6 is a diagram illustrating reception of a portable device registration mode start signal according to a preferred embodiment of the present invention.

As shown in FIG. 6, the portable device 1 (registered portable device 1a) transmits a portable device registration mode start signal SS (hereinafter referred to as a "start signal SS") based on an input operation on the portable device operator 14. The controller 2 receives the start signal SS from the registered portable device 1a and performs a control to authenticate and register the unregistered portable device 1b corresponding to a received wireless signal as a new registered portable device 1a based on having received the wireless signal (the lock signal SL or the unlock signal SU) from the unregistered portable device 1b. The controller 2 starts the portable device registration mode in which the unregistered portable device 1b is newly authenticated and registered based on having received the start signal SS. The start signal SS is an example of a "specific wireless signal".

The controller 2 performs a control to start the portable device registration mode based on having received the start signal SS from the registered portable device 1a. The controller 2 performs a control to authenticate and register the unregistered portable device 1b corresponding to the received wireless signal as a new registered portable device 1a based on having received the wireless signal (the lock signal SL or the unlock signal SU) from the unregistered portable device 1b during the period during which the portable device registration mode is executed.

Specifically, the controller 2 performs a control to start the portable device registration mode within a period T1 after a time t1 at which the unlock control is started by receiving the unlock signal SU from the registered portable device 1a (a time at which the main power supply relay 25b starts to be driven) and when the start signal SS is received from the registered portable device 1a. The period T1 is preferably set to about 10 seconds, for example.

The start signal SS is a signal based on a combination of the lock signal SL and the unlock signal SU. The registered portable device 1a alternately transmits the lock signal SL and the unlock signal SU to the controller 2 based on having alternately performed an input operation on the lock operator 14a and the unlock operator 14b. The controller 2 performs a control to determine, after (upon or immediately after) having alternately received the lock signal SL and the unlock signal SU from the registered portable device 1a, that the start signal SS has been received. For example, the controller 2 determines having alternately received the lock signal SL and the unlock signal SU a plurality of times (three times, for example) from the registered portable device 1a as having received the start signal SS.

Figure 7:
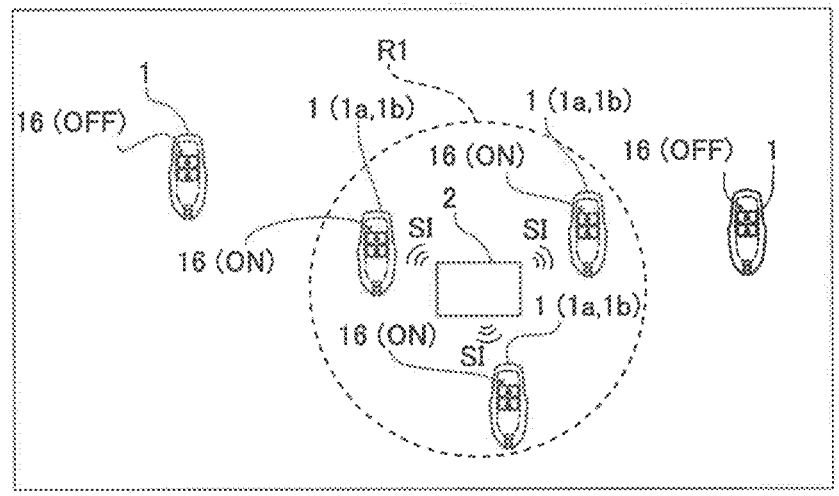
FIG. 7 is a diagram illustrating transmission of a notification signal according to a preferred embodiment of the present invention.

As shown in FIG. 7, the controller 2 transmits the notification signal SI to the portable device 1 when the portable device registration mode is started (time t2). Specifically, the controller 2 transmits the notification signal SI to each of the portable devices 1 disposed within the range R1 in which LF communication is possible. At this time, the controller 2 transmits the notification signal SI regardless of the registered portable device 1a and the unregistered portable device 1b.

The portable device 1 that has received the notification signal SI makes an announcement indicating that the notification signal SI has been received by outputting light from the notifier 16. That is, at this time, the light emitting diode of the portable device 1 that makes LF communication with the controller 2 among the portable devices 1 is turned on.

Figure 8:
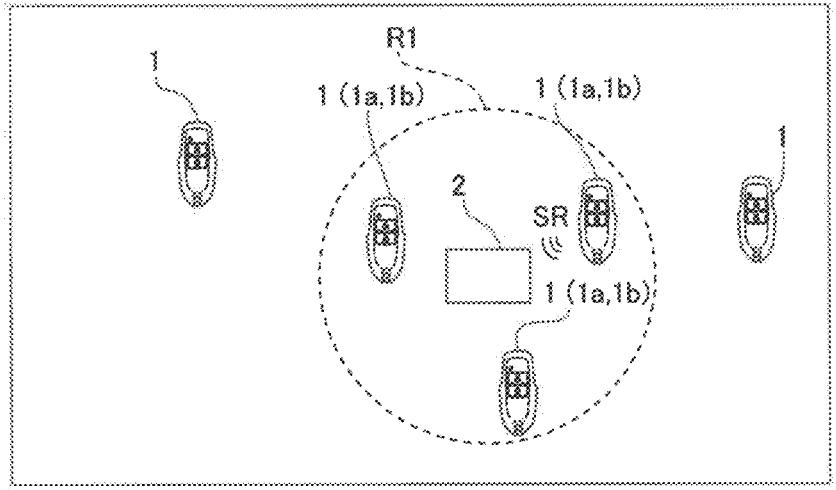
FIG. 8 is a diagram illustrating transmission of a request signal according to a preferred embodiment of the present invention.

As shown in FIG. 8, upon receiving the notification signal SI (in a state in which the notifier 16 is outputting light), the unregistered portable device 1b transmits a request signal SR, which is a wireless signal to request authentication and registration, to the controller 2 based on an input operation on the portable device operator 14. After transmitting the notification signal SI, the controller 2 performs a control to authenticate and register the unregistered portable device 1b corresponding to the request signal SR as a new registered portable device 1a based on having received the request signal SR from the unregistered portable device 1b. The controller 2 controls the buzzer 26 to output a sound and performs a control to end the portable device registration mode. The unregistered portable device 1b stops (turns off) the announcement by the notifier 16 when the portable device registration mode is ended.

Upon receiving the notification signal SI (in a state in which the notifier 16 is outputting light), the registered portable device 1a transmits the request signal SR, which is a wireless signal to request authentication and registration, to the controller 2 based on an input operation to the portable device operator 14. In such a case, after transmitting the notification signal SI, the controller 2 does not authenticate or register a new registered portable device 1a based on having received the request signal SR from the registered portable device 1a. The controller 2 controls the buzzer 26 to output a sound and performs a control to end the portable device registration mode. The registered portable device 1a stops (turns off) the announcement by the notifier 16 when the portable device registration mode is ended.

When an input operation is not performed on the portable device operator 14 in any of the portable devices 1 that have received the notification signals SI within the period T4 from the time t2 at which the notification signal SI is received (the controller 2 transmits the notification signal SI), the controller 2 controls the buzzer 26 to output a sound and performs a control to end the portable device registration mode. The portable device 1 that has received the notification signal SI stops (turns off) the announcement by the notifier 16 when the portable device registration mode is ended. The period T4 is a period during which the portable device registration mode is executed, and is about 10 seconds, for example.

The controller 2 receives an arbitrary wireless signal of the lock signal SL and the unlock signal SU transmitted from the unregistered portable device 1b as the request signal SR. That is, upon receiving the notification signal SI, the unregistered portable device 1b transmits the request signal SR to the controller 2 based on an input operation on any of the lock operator 14a and the unlock operator 14b.

The controller 2 stores, in the storage 24 (see FIG. 2), the authentication code C included in the lock signal SL or the unlock signal SU received from the unregistered portable device 1b corresponding to the request signal SR as the control of authentication and registration as a new registered portable device 1a.

Figure 9:
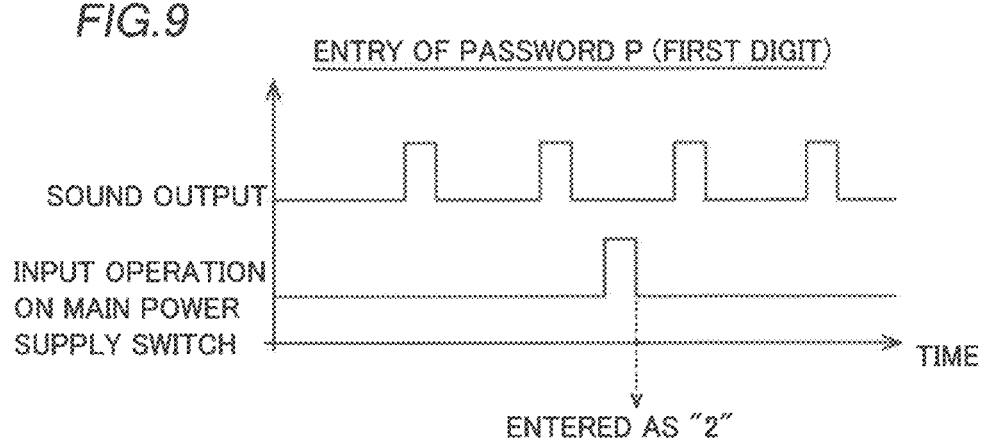
FIG. 9 is a diagram illustrating entry of the first digit of a password according to a preferred embodiment of the present invention.
Figure 10:
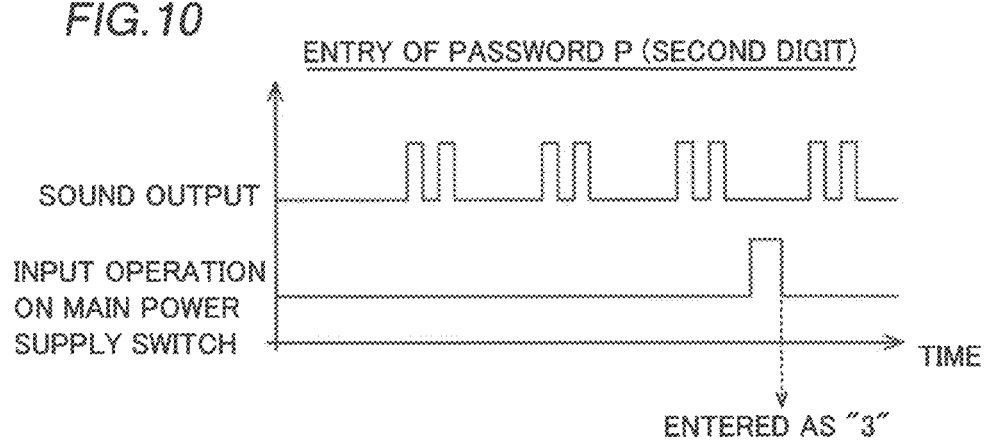
FIG. 10 is a diagram illustrating entry of the second digit of a password according to a preferred embodiment of the present invention.

As shown in FIGS. 9 and 10, the main power supply switch 25a of the controller 2 receives an operation of entering the password P. When the password P corresponding to (matching) a preset password P (a password P stored in the storage 24) is entered through the main power supply switch 25a, the controller 2 performs a control to start the portable device registration mode. Thus, even when all the registered portable devices 1a are lost or the registered portable device 1a is not disposed within a range in which communication with the controller 2 is possible, the controller 2 performs a control to start the portable device registration mode when the password P is entered through the main power supply switch 25a. Control after the start of the portable device registration mode is similar to that in the "configuration related to authentication and registration of the unregistered portable device using the registered portable device" described above, and thus description thereof is omitted.

Figure 11:
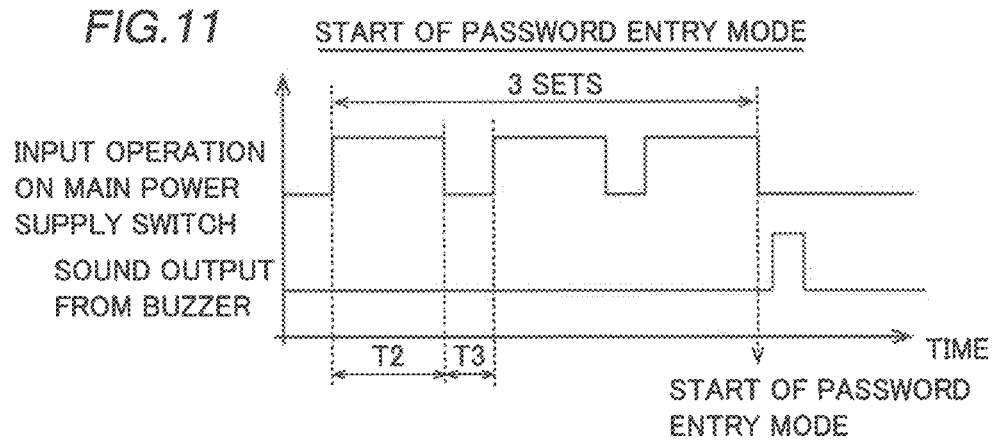
FIG. 11 is a diagram illustrating the start of a password entry mode according to a preferred embodiment of the present invention.

Specifically, as shown in FIG. 11, the controller 2 performs a control to start a password entry mode in which the password P entered into the main power supply switch 25a is acquired based on an intermittent input operation on the main power supply switch 25a, and performs a control to start the portable device registration mode when the password P corresponding to the preset password P is entered into the main power supply switch 25a during a period during which the password entry mode is executed. The intermittent input operation is an example of a "predetermined input operation".

For example, when three sets of an input operation (pressing) for a period T2 (five seconds, for example) or more on the main power supply switch 25a and a subsequent non-operation (non-pressing) for a period T3 (five seconds, for example) or more are performed, the controller 2 determines that the intermittent input operation described above has been acquired and starts the password entry mode. Then, the controller 2 controls the buzzer 26 to output a sound. That is, the buzzer 26 announces the start of the password entry mode to the marine vessel operator.

As shown in FIGS. 9 and 10, the controller 2 acquires the password P corresponding to the type of sound output from the buzzer 26 and corresponding to an input operation on the main power supply switch 25a during the period during which the password entry mode is executed. That is, the password P is entered according to the output sound and the timing (a time) at which the main power supply switch 25a is operated.

For example, the controller 2 acquires a 4-digit password P. As shown in FIG. 9, the controller 2 controls the buzzer 26 to output a short sound a plurality of times (nine times, for example) (only four outputs are shown in the figure) as the first digit of the password P. Then, for example, when an input operation is performed on the main power supply switch 25a after the second output and before the third output, the controller 2 acquires "2" ("2" is entered) as the first digit of the password P. Furthermore, the controller 2 controls the buzzer 26 to output two short sounds a plurality of times (nine times, for example) (only four outputs are shown in the figure) as the second digit of the password P. Then, for example, when an input operation is performed on the main power supply switch 25a after the third output and before the fourth output, the controller 2 acquires "3" ("3" is entered) as the second digit of the password P. The third and fourth digits of the password P are entered similarly to the entry of the first and second digits of the password P described above by changing the number of short sounds (or the type of sound) output from the buzzer 26.

Then, the controller 2 collates the entered password P with the preset password P (stored in the storage 24), and performs a control to start the portable device registration mode when they match each other.

Figure 12:
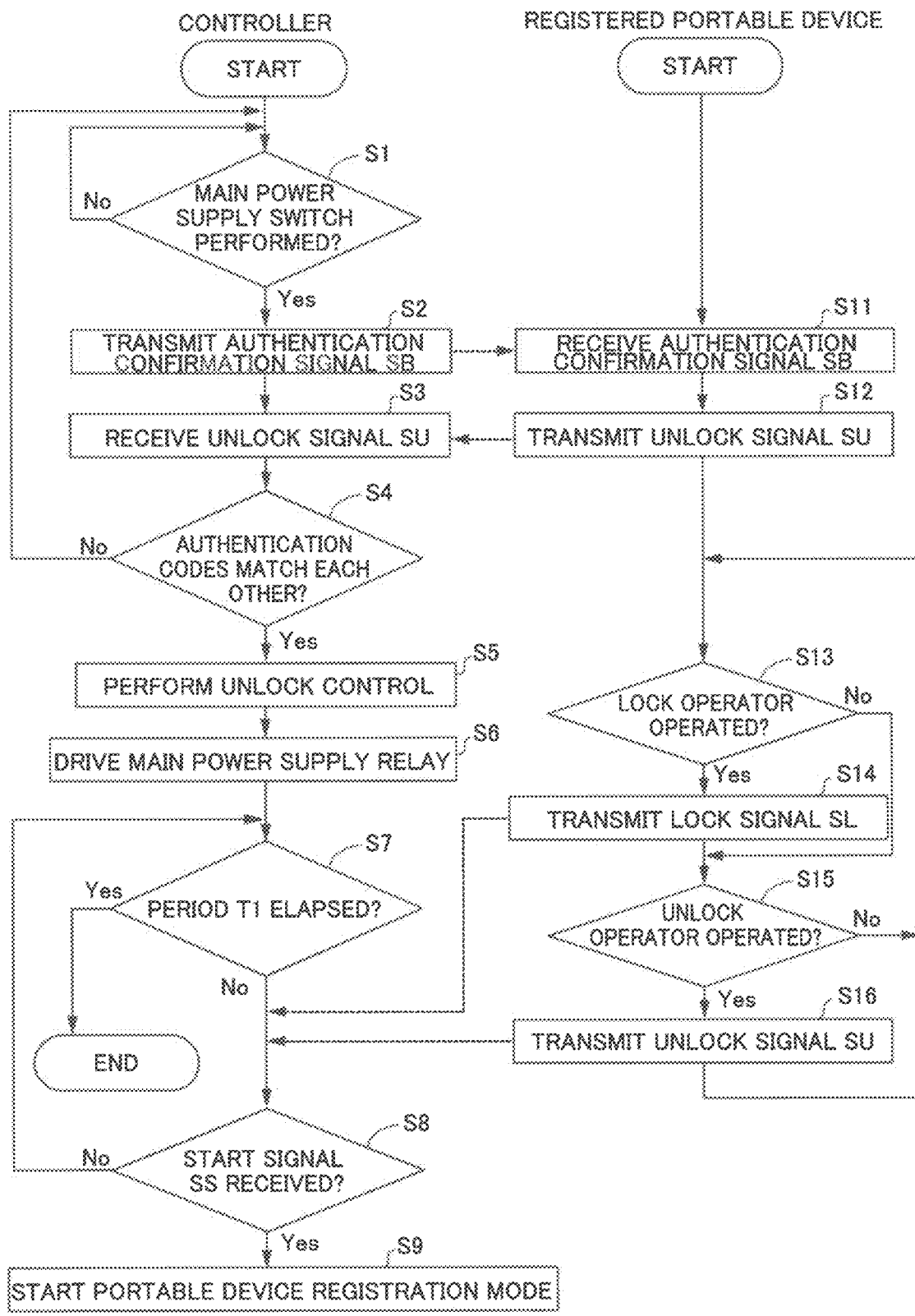
FIG. 12 is a diagram (flowchart) illustrating the start of a portable device registration mode using a registered portable device according to a preferred embodiment of the present invention.
Figure 13:
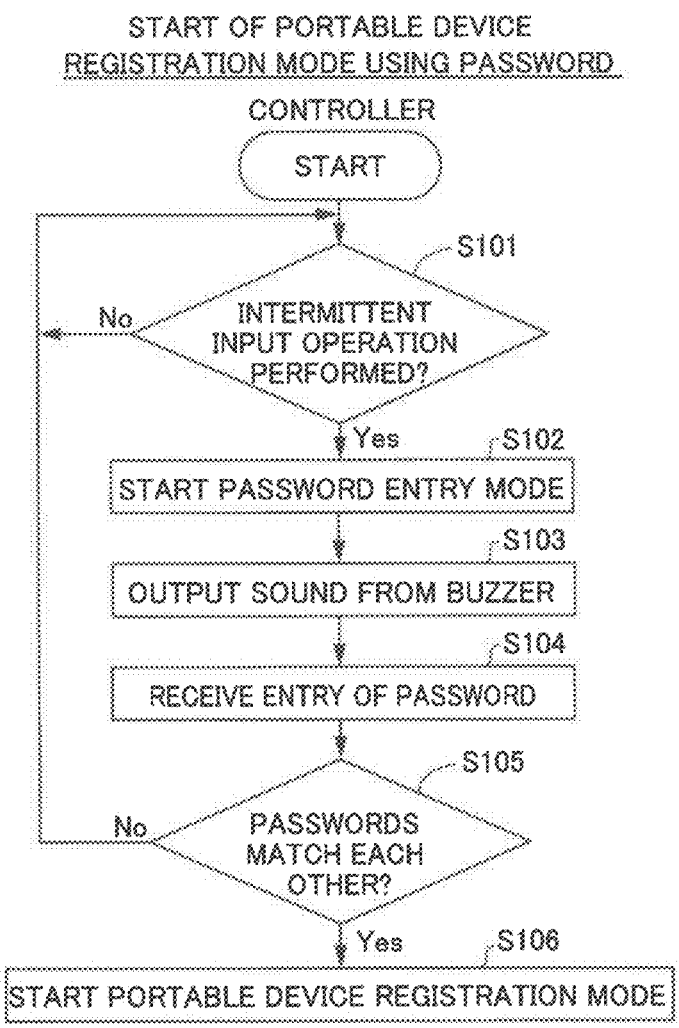
FIG. 13 is a diagram (flowchart) illustrating the start of a portable device registration mode using a password according to a preferred embodiment of the present invention.

A marine vessel 110 portable device registration method according to a preferred embodiment of the present invention is now described with reference to FIGS. 12 to 14. A control process of the portable devices 1 (the registered portable device 1a and the unregistered portable device 1b) is performed by the portable device controllers 15, and a control process of the controller 2 is performed by the main body controller 21.

First, a method for starting the portable device registration mode using the registered portable device 1a in the system 100 is described. FIG. 12 shows a control process flow to start the portable device registration mode using the registered portable device 1a.

In step S1, the controller 2 determines whether or not an input operation has been performed on the main power supply switch 25a. This determination is repeated until an input operation is performed on the main power supply switch 25a. When an input operation is performed, the controller 2 advances to step S2.

In step S2, the authentication confirmation signal SB is transmitted from the controller 2 to the portable device 1 (registered portable device 1a). In step S11, the registered portable device 1a receives the authentication confirmation signal SB. In step S12, the unlock signal SU is transmitted from the registered portable device 1a to the controller 2. In step S3, the controller 2 receives the unlock signal SU.

In step S4, the controller 2 collates the authentication code C with the authentication code C stored in advance in the storage 24. When the authentication code C matches the authentication code C stored in advance, the controller 2 advances to step S5, and when the authentication code C does not match the authentication code C stored in advance, the controller 2 returns to step S1.

In step S5, the unlock control is performed. Thereafter, in step S6, the main power supply relay 25b is driven. Thereafter, in step S7, the controller 2 determines whether or not the period T1 (see FIG. 6) has elapsed since the time t1 at which the unlocking control was started. When the period T1 has elapsed, the controller 2 terminates control related to the start of the portable device registration mode using the registered portable device 1a. When the period T1 has not elapsed in step S7, the controller 2 advances to step S8.

In step S8, the controller 2 determines whether or not the start signal SS has been received from the registered portable device 1a. When the start signal SS has been received, the controller 2 advances to step S9. When the start signal SS has not been received, the controller 2 returns to step S7. That is, during the period T1, the start signals SS (the lock signal SL and the unlock signal SU) is transmitted from the registered portable device 1a to the controller 2 based on having alternately performed an input operation on the lock operator 14a and the unlock operator 14b a plurality of times (three times, for example) in the registered portable device 1a.

Specifically, in step S13, the registered portable device 1a determines whether or not the lock operator 14a has been operated. When the lock operator 14a has been operated, the registered portable device 1a advances to step S14, and when the lock operator 14a has not been operated, the registered portable device 1a advances to step S15. In step S14, the lock signal SL is transmitted from the registered portable device 1a to the controller 2. In step S15, the registered portable device 1a determines whether or not the unlock operator 14b has been operated. When the unlock operator 14b has been operated, the registered portable device 1a advances to step S16. When the unlock operator 14b has not been operated, the registered portable device 1a returns to step S13. In step S16, the unlock signal SU is transmitted from the registered portable device 1a to the controller 2. Thereafter, the registered portable device 1a returns to step S13.

In step S9, the controller 2 starts the portable device registration mode. Thereafter, step S201 to step S206 (see FIG. 14) described below are executed.

Next, a method for starting the portable device registration mode using the password P in the system 100 (controller 2) is now described. FIG. 13 shows a control process flow to start the portable device registration mode using the password P.

In step S101, the controller 2 determines whether or not the intermittent input operation has been performed on the main power supply switch 25a. That is, the controller 2 determines whether or not the three sets of operations other than the operation (pressing) for the period T3 or more after the operation (pressing) for the period T2 or more have been performed on the main power supply switch 25a. This determination is repeated until the intermittent input operation is performed. When the intermittent input operation has been performed, the controller 2 advances to step S102.

In step S102, the password entry mode is started by the controller 2. In step S103, the buzzer 26 outputs a sound. In step S104, receiving the entry of the password P is started through the main power supply switch 25a of the controller 2. That is, the password P is entered according to the sound output from the buzzer 26 and the timing (time) at which the main power supply switch 25a is operated.

In step S105, the controller 2 collates the entered password P with the preset password P. When the entered password P matches the preset password P, the controller 2 advances to step S106. When the entered password P does not match the preset password P, the controller 2 returns to step S101.

In step S106, the controller 2 starts the portable device registration mode. Thereafter, step S201 to step S206 (see FIG. 14) described below are executed.

Next, a method for authenticating and registering the unregistered portable device 1b in the portable device registration mode of the system 100 is described.

In step S201, the notification signal SI is transmitted from the controller 2 to each of the portable devices 1 within the range R1 (see FIG. 7). In step S221, the notification signal SI is received by the portable device 1. Thereafter, in step S222, light is output from the notifier 16 of the portable device 1. That is, the announcement indicating that the notification signal SI has been received is made. In step S202, the controller 2 determines whether or not the period T4 has elapsed since the time t2 at which the controller 2 transmitted the notification signal SI. When the period T4 has elapsed, the controller 2 advances to step S206. When the period T4 has not elapsed, the controller 2 advances to step S203. In step S223, the portable device 1 determines whether or not the period T4 has elapsed since the time t2 at which the portable device 1 received the notification signal SI. When the period T4 has elapsed, the portable device 1 advances to step S226. When the period T4 has not elapsed, the portable device 1 advances to step S224.

In step S224, the portable device 1 determines whether or not an input operation (arbitrary input operation) has been performed on either the lock operator 14a or the unlock operator 14b of the unregistered portable device 1b. When the input operation has been performed, the portable device 1 returns to step S223. When the input operation has been performed, the portable device 1 advances to step S225. In step S225, the request signal SR (the lock signal SL or the unlock signal SU) is transmitted from the portable device 1 to the controller 2. Thereafter, the portable device 1 advances to step S226.

In step S203, the request signal SR is received by the controller 2. In step S204, the controller 2 determines whether or not the request signal SR has been received from the unregistered portable device 1b. When the request signal SR has been received from the unregistered portable device 1b, the controller 2 advances to step S205, and when the request signal SR has been received from the registered portable device 1a that is not the unregistered portable device 1b, the controller 2 advances to step S206. In step S205, the unregistered portable device 1b corresponding to the received request signal SR is authenticated and registered as a new registered portable device 1a by the controller 2. That is, the authentication code C corresponding to the request signal SR is stored in the storage 24 of the controller 2. Thereafter, the controller 2 advances to step S206.

In step S206, a sound is output from the buzzer 26. At this time, a sound output when a new registered portable device 1a is authenticated and registered may be different in type from a sound output when a new registered portable device 1a is not authenticated or registered by the controller 2. That is, a sound output when authentication and registration are successful and a sound output when authentication and registration are unsuccessful may be different from each other. Thereafter, the portable device registration mode is ended by the controller 2. Then, in step S226, the portable device 1 terminates (turns off) the announcement by the notifier 16.

According to the various preferred embodiments of the present invention described above, the following advantageous effects are achieved.

According to a preferred embodiment of the present invention, the registered portable device 1a transmits the start signal SS based on an input operation on the portable device operator 14. Furthermore, the controller 2 receives the start signal SS from the registered portable device 1a and performs a control to authenticate and register the unregistered portable device 1b corresponding to the received wireless signal as a new registered portable device 1a based on having received the wireless signal from the unregistered portable device 1b. Accordingly, even when the controller 2 is attached to the inside of the hull 112 of the marine vessel 110, the unregistered portable device 1b is able to be authenticated and registered as a new registered portable device 1a by performing an input operation on the registered portable device 1a without opening an inner portion of the hull 112 of the marine vessel 110 and connecting a connector of a re-registration device to a connector of a main body device. Consequently, the work burden of authenticating and registering a new portable device 1 (unregistered portable device 1b) is reduced. Furthermore, when the start signal SS is received from the registered portable device 1a, the authentication and registration are performed such that the security at the time of the authentication and registration is improved as compared with the case in which the controller 2 is constantly in a state in which the authentication and registration are possible. Consequently, when a new portable device is authenticated and registered while the security is improved, the work burden of authenticating and registering a new portable device 1 is reduced as compared with the case in which a re-registration device is prepared and a connector of the re-registration device is connected to a connector of the controller.

According to a preferred embodiment of the present invention, the registered portable device 1a transmits the lock signal SL, which is a wireless signal for the controller 2 to perform the lock control to lock at least a portion of the marine vessel 110, to the controller 2 based on an input operation on the portable device operator 14, and transmits the unlock signal SU, which is a wireless signal for the controller 2 to perform the unlock control to unlock the lock control, to the controller 2 based on another input operation on the portable device operator 14. Furthermore, the controller 2 performs a control to receive the signal based on the combination of the lock signal SL and the unlock signal SU from the registered portable device 1a as the start signal SS. Accordingly, it is not necessary to add a structure that transmits a dedicated signal for authenticating and registering a new portable device 1 separate from the lock signal and the unlock signal to the portable device 1 that transmits the lock signal SL and the unlock signal SU, and thus a complex structure of the portable device 1 is prevented.

According to a preferred embodiment of the present invention, the portable device operator 14 of the registered portable device 1a includes the lock operator 14a and the unlock operator 14b separate from each other. Furthermore, the registered portable device 1a alternately transmits the lock signal SL and the unlock signal SU to the controller 2 based on having alternately performed an input operation on the lock operator 14a and the unlock operator 14b. In addition, the controller 2 performs a control to determine, after having alternately received the lock signal SL and the unlock signal SU from the registered portable device 1a, that the start signal SS has been received. Accordingly, when the marine vessel operator intends to perform the lock control or the unlock control and does not intend to authenticate and register the unregistered portable device 1b, the controller 2 is prevented from performing a control to determine that the start signal SS has been received. Furthermore, a period is required for the marine vessel operator to alternately move his or her finger between the lock operator 14a and the unlock operator 14b in order to alternately transmit the lock signal SL and the unlock signal SU. Thus, as compared with the case in which the marine vessel operator continuously performs an input operation a plurality of times on the lock operator 14a or the unlock operator 14b without alternately moving his or her finger, the period is required for the marine vessel operator to alternately move his or her finger, and thus the controller 2 easily distinguishes each input operation.

According to a preferred embodiment of the present invention, the controller 2 performs the control to determine, after having alternately received the lock signal SL and the unlock signal SU a plurality of times from the registered portable device 1a, that the start signal SS has been received. Accordingly, as compared with the case in which having alternately received the lock signal SL and the unlock signal SU once is determined as having received the start signal SS, a control to authenticate and register the unregistered portable device 1b is further prevented from being performed when authentication and registration of the unregistered portable device 1b are not intended.

According to a preferred embodiment of the present invention, the controller 2 performs a control to start the portable device registration mode in which the unregistered portable device 1b is newly authenticated and registered based on having received the start signal SS from the registered portable device 1a, and performs a control to authenticate and register the unregistered portable device 1b corresponding to the received wireless signal as a new registered portable device 1a based on having received the wireless signal from the unregistered portable device 1b during the period during which the portable device registration mode is executed. Accordingly, a control to authenticate and register the unregistered portable device 1b as a new registered portable device 1a is performed during the period during which the portable device registration mode separate from a normal mode (a mode in which the authentication control process is performed) is executed, and thus the unregistered portable device 1b is prevented from being authenticated and registered as a new registered portable device 1a during a period during which the normal mode is executed.

According to a preferred embodiment of the present invention, the controller 2 includes the main power supply switch 25a and the main power supply relay 25b, and transmits the authentication confirmation signal SB to the registered portable device 1a based on an input operation on the main power supply switch 25a. Furthermore, the registered portable device 1a transmits the unlock signal SU to the controller 2 in response to acquiring the authentication confirmation signal SB. In addition, the controller 2 performs a control to start the portable device registration mode after the time t1 at which the unlock control is started by receiving the unlock signal SU from the registered portable device 1a and when the start signal SS is received from the registered portable device 1a in a state in which the main power supply relay 25b is driven. Accordingly, an operation of authenticating and registering the unregistered portable device 1b as a new registered portable device 1a is performed in a state in which the marine vessel operator performs an input operation on the main power supply switch 25a and performs an operation on the marine vessel 110 (a state in which the lock is released). Thus, the unregistered portable device 1b is prevented from being authenticated and registered as a new registered portable device 1a at a time at which the marine vessel operator does not intend to operate the marine vessel 110 and to authenticate and register the unregistered portable device 1b. Furthermore, the control to start the portable device registration mode is performed in a state in which the main power supply relay 25b is driven such that the operation (switching between the lock control and the unlock control, for example) of the controller 2 not intended by the marine vessel operator other than the start of the portable device registration mode is prevented from being performed based on the start signal SS from the registered portable device 1a.

According to a preferred embodiment of the present invention, the controller 2 performs the control to start the portable device registration mode when the start signal SS is received within the period T1 from the time t1 at which the unlock control is started. Accordingly, a period in which the portable device registration mode is started is limited to the period T1, and thus the portable device registration mode is prevented from being started in a period other than the period T1, which is not intended by the marine vessel operator.

According to a preferred embodiment of the present invention, the plurality of portable devices 1 each include the notifier 16 that makes an announcement by outputting a sound or light. Furthermore, the controller 2 transmits the notification signal SI to each of the portable devices 1 when the portable device registration mode is started. The notifier 16 of each of the portable devices 1 makes the announcement indicating that the notification signal SI has been received upon receiving the notification signal SI. Accordingly, the marine vessel operator is notified that each of the portable devices 1 has received the notification signal SI, and thus the convenience of authentication and registration is improved.

According to a preferred embodiment of the present invention, the plurality of portable devices 1 each include the notifier 16 as a light emitter. Furthermore, the unregistered portable device 1b outputs light from the notifier 16 upon receiving the notification signal SI. Accordingly, the marine vessel operator visually recognizes that the portable device 1 has received the notification signal SI from the notifier 16 provided in the unregistered portable device 1b. Consequently, the convenience of authentication and registration is further improved.

According to a preferred embodiment of the present invention, the unregistered portable device 1b transmits the request signal SR, which is a wireless signal to request authentication and registration, to the controller 2 based on an input operation on the portable device operator 14 upon receiving the notification signal SI. Furthermore, the controller 2 performs a control to authenticate and register the unregistered portable device 1b corresponding to the request signal SR as a new registered portable device 1a based on having received the request signal SR from the unregistered portable device 1b after transmitting the notification signal SI. Accordingly, the request signal SR is transmitted based on having received the notification signal SI and the input operation on the portable device operator 14, and thus the unregistered portable device 1b intended for authentication and registration by the marine vessel operator is easily identified from the plurality of portable devices 1 by receiving the request signal SR.

According to a preferred embodiment of the present invention, the portable device operator 14 of the unregistered portable device 1b includes the lock operator 14a and the unlock operator 14b separate from each other. Furthermore, the unregistered portable device 1b transmits the request signal SR to the controller 2 based on an input operation on any of the lock operator 14a and the unlock operator 14b upon receiving the notification signal SI. Accordingly, the request signal SR is transmitted to the controller 2 based on the input operation on any of the lock operator 14a and the unlock operator 14b without providing a dedicated operator to transmit the request signal SR to the controller 2. Consequently, the request signal SR is transmitted while a complex structure of the portable device 1 is prevented. Furthermore, the unregistered portable device 1b transmits the request signal SR to the controller 2 based on the input operation on any of the lock operator 14a and the unlock operator 14b, and thus an input operation performed by the marine vessel operator to transmit the request signal SR is simplified.

According to a preferred embodiment of the present invention, the controller 2 performs a control to authenticate and register a new registered portable device 1a based on having received the request signal SR from the unregistered portable device 1b during the period T4 during which the portable device registration mode is executed, and performs a control to end the portable device registration mode. Furthermore, the controller 2 performs a control to end the portable device registration mode without performing a control to authenticate and register a new registered portable device 1a based on having received the request signal SR from the registered portable device 1a during the period T4 during which the portable device registration mode is executed, or based on that the period T4 during which the portable device registration mode is executed has elapsed. Accordingly, a new registered portable device 1a is authenticated and registered, the request signal SR is transmitted from the registered portable device 1a to the controller 2, or the period T4 during which the portable device registration mode is executed elapses such that the portable device registration mode is ended.

According to a preferred embodiment of the present invention, the controller 2 includes the main power supply switch 25a that receives an operation of entering the password P. Furthermore, the controller 2 performs a control to start the portable device registration mode when the password P corresponding to the preset password P is entered through the main power supply switch 25a. Accordingly, even when the start signal SS is not received from the registered portable device 1a, the controller 2 starts the portable device registration mode while the security is enhanced with the password P. That is, even when all the registered portable devices 1a are lost, or even when the registered portable devices 1a are disposed at a location (such as on land) at which wireless communication with the controller 2 of the marine vessel 110 located on the water is not possible, the password P is entered into the main power supply switch 25a such that the unregistered portable device 1b is newly authenticated and registered as a registered portable device 1a while the security is enhanced. Furthermore, even when all the registered portable devices 1a are lost, it is not necessary to replace the controller 2.

According to a preferred embodiment of the present invention, the controller 2 performs a control to start the password entry mode in which the password P entered into the main power supply switch 25a is acquired based on the intermittent input operation (predetermined input operation) on the main power supply switch 25a, and performs a control to start the portable device registration mode when the password P corresponding to the preset password P is entered into the main power supply switch 25a during the period during which the password entry mode is executed. Accordingly, the password P is prevented from being entered during a period during which the password entry mode is not executed and when the marine vessel operator does not intend to enter the password P. Furthermore, it is not necessary to provide a password operator separately from the main power supply switch 25a. Consequently, the controller 2 starts the password entry mode while a complex structure of the controller 2 is significantly reduced or prevented.

According to a preferred embodiment of the present invention, the controller 2 includes the buzzer 26 that outputs a sound, and acquires the password P corresponding to an input operation on the main power supply switch 25a corresponding to the type of sound output from the buzzer 26. Accordingly, different words (codes) defining different types of sounds are entered into one main power supply switch 25a, and thus an increase in the number of main power supply switches 25a (switches) is prevented.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the marine vessels are preferably small marine vessels and outboard motor boats in preferred embodiments described above, the present invention is not restricted to this. That is, the marine vessel may alternatively be a large marine vessel, may alternatively include a propeller on the hull without providing an outboard motor on the marine vessel, or may alternatively include a jet propulsion unit.

While the controllers are preferably disposed inside the marine vessel operation units (consoles) in preferred embodiments described above, the present invention is not restricted to this. That is, the controller may alternatively be disposed in any portion of a marine vessel body other than the inside of the marine vessel operation unit (console).

While the control to determine, after having alternately (three times, for example) received the lock signal and the unlock signal, that the start signal SS has been received is preferably performed in preferred embodiments described above, the present invention is not restricted to this. For example, the control to determine, after having received the unlock signal a plurality of times after having received the lock signal a plurality of times, that the start signal SS has been received may alternatively be performed.

While a period in which the start signal is received is preferably limited to the period T1 after the time t1 at which the unlock control is started in preferred embodiments described above, the present invention is not restricted to this. For example, the start signal may alternatively be received until an operation of ending reception of the start signal is performed on the controller (without providing the period T1).

While the notifiers of the portable devices preferably output light in preferred embodiments described above, the present invention is not restricted to this. For example, the notifier of the portable device may alternatively output a sound.

While the request signals are preferably transmitted from the portable devices based on input operations on any of the lock operators and the unlock operators in preferred embodiments described above, the present invention is not restricted to this. For example, only one of the lock operator and the unlock operator may alternatively be configured as an operator to transmit the request signal.

While the password operators are preferably configured as the main power supply switches in preferred embodiments described above, the present invention is not restricted to this. For example, a dedicated password operator may alternatively be provided as long as there is little problem in increasing the number of operators.

While the passwords are preferably 4-digit numbers in preferred embodiments described above, the present invention is not restricted to this. For example, the password may alternatively be symbols or characters other than a number.

While three sets of an operation on the main power supply switch 25a during the period T2 and a non-operation on the main power supply switch 25a during the period T3 are preferably performed as the intermittent input operation on the main power supply switch 25a in preferred embodiments described above, the present invention is not restricted to this. That is, as long as an input operation is intermittent, the intermittent input operation is not limited to the example in preferred embodiments described above.

While the controllers preferably acquire the password corresponding to the input operation on the main power supply switch corresponding to the type of sound output from the buzzer in preferred embodiments described above, the present invention is not restricted to this. For example, the controller may alternatively acquire a password corresponding to an input operation on the main power supply switch corresponding to the type of light (a blinking interval, a color, etc.) output from a light emitter.

While one outboard motor is preferably provided on the marine vessel in preferred embodiments described above, the present invention is not restricted to this. For example, a plurality of outboard motors may alternatively be provided on the marine vessel. In such a case, an authentication control process for the plurality of outboard motors may be performed by one controller and one registered portable device.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel portable device registration system comprising:
    a plurality of portable devices, each including a portable device operator, that transmit an authentication signal that is a wireless signal; and
    a controller, disposed on a marine vessel, configured or programmed to receive the authentication signal from any of the plurality of portable devices and perform an authentication control process related to control of the marine vessel based on the authentication signal that has been received; wherein
    a registered portable device, which is a portable device that has been authenticated and registered by the controller among the plurality of portable devices, transmits a specific wireless signal based on an input operation on the portable device operator of the registered portable device; and
    the controller is configured or programmed to receive the specific wireless signal from the registered portable device, and perform a control to authenticate and register an unregistered portable device that is a portable device other than the registered portable device among the plurality of portable devices, the unregistered portable device corresponding to the wireless signal that has been received, as a new registered portable device based on having received the wireless signal from the unregistered portable device;
    the controller is configured or programmed to perform a control to start a portable device registration mode in which the unregistered portable device is newly authenticated and registered based on having received the specific wireless signal from the registered portable device; and
    the controller is configured or programmed to perform a control to end the portable device registration mode without performing the control to authenticate and register the new registered portable device based on having received the wireless signal from the registered portable device during the period during which the portable device registration mode is executed, or based on that the period during which the portable device registration mode is executed has elapsed.

2. The marine vessel portable device registration system according to claim 1, wherein
    the registered portable device transmits a lock signal, which is the wireless signal for the controller to perform a lock control to lock at least a portion of the marine vessel, to the controller based on an input operation on the portable device operator of the registered portable device, and transmits an unlock signal, which is the wireless signal for the controller to perform an unlock control to unlock the lock control, to the controller based on another input operation on the portable device operator of the registered portable device; and the controller is configured or programmed to perform a control to receive a signal based on a combination of the lock signal and the unlock signal from the registered portable device as the specific wireless signal.

3. The marine vessel portable device registration system according to claim 2, wherein the portable device operator of the registered portable device includes a lock operator and an unlock operator separate from each other;

the registered portable device alternately transmits the lock signal and the unlock signal to the controller based on having alternately performed an input operation on the lock operator and the unlock operator; and the controller is configured or programmed to perform a control to determine, after having alternately received the lock signal and the unlock signal from the registered portable device, that the specific wireless signal has been received.

4. The marine vessel portable device registration system according to claim 3, wherein the controller is configured or programmed to perform the control to determine, after having alternately received the lock signal and the unlock signal a plurality of times from the registered portable device, that the specific wireless signal has been received.

5. The marine vessel portable device registration system according to claim 1, wherein the controller is configured or programmed to perform the control to authenticate and register the unregistered portable device corresponding to the wireless signal that has been received as the new registered portable device based on having received the wireless signal from the unregistered portable device during a period during which the portable device registration mode is executed.

6. The marine vessel portable device registration system according to claim 5, wherein the controller includes a main power supply switch and a main power supply relay, and is configured or programmed to transmit an authentication confirmation signal to the registered portable device based on an input operation on the main power supply switch;

the registered portable device transmits an unlock signal, which is the wireless signal for the controller to perform an unlock control to unlock the lock control, to the controller in response to acquiring the authentication confirmation signal; and the controller is configured or programmed to perform the control to start the portable device registration mode after a time at which the unlock control is started by receiving the unlock signal from the registered portable device and when the specific wireless signal is received from the registered portable device in a state in which the main power supply relay is driven.

7. The marine vessel portable device registration system according to claim 6, wherein the controller is configured or programmed to perform the control to start the portable device registration mode when the specific wireless signal is received within a predetermined period from the time at which the unlock control is started.

8. The marine vessel portable device registration system according to claim 5, wherein the controller is configured or programmed to perform a control to authenticate and register the new registered portable device based on having received the wireless signal from the unregistered portable device during the period during which the portable device registration mode is executed and perform a control to end the portable device registration mode.

9. The marine vessel portable device registration system according to claim 5, wherein the controller includes a password operator that receives an operation of entering a password; and the controller is configured or programmed to perform the control to start the portable device registration mode when the password corresponding to a preset password is entered through the password operator.

10. The marine vessel portable device registration system according to claim 9, wherein the controller is configured or programmed to perform a control to start a password entry mode in which the password entered into the password operator is acquired based on a predetermined input operation on the password operator, and perform the control to start the portable device registration mode when the password corresponding to the preset password is entered into the password operator during a period during which the password entry mode is executed.

11. The marine vessel portable device registration system according to claim 10, wherein the password operator includes a main power supply switch of the controller; and the controller is configured or programmed to perform the control to start the password entry mode based on an intermittent input operation on the main power supply switch.

12. The marine vessel portable device registration system according to claim 9, wherein the password operator includes a main power supply switch of the controller; and the controller includes a controller sound output that outputs a sound, and is configured or programmed to acquire the password corresponding to an input operation on the main power supply switch corresponding to a type of the sound output from the controller sound output.

13. A marine vessel portable device registration method for authenticating and registering a new portable device, the method comprising:

performing an authentication control process related to control of a marine vessel based on an authentication signal that is a wireless signal received from a portable device;

receiving a specific wireless signal based on an input operation on a portable device operator of a registered portable device, which is the portable device that has been authenticated and registered, from the registered portable device;

then receiving the wireless signal from an unregistered portable device, which is the portable device other than the registered portable device among a plurality of portable devices;

then authenticating and registering the unregistered portable device corresponding to the wireless signal that has been received as a new registered portable device;

starting a portable device registration mode in which the unregistered portable device is newly authenticated and registered based on having received the specific wireless signal from the registered portable device; and ending the portable device registration mode without performing the control to authenticate and register the new registered portable device based on having received the wireless signal from the registered portable device during the period during which the portable device registration mode is executed, or based on that the period during which the portable device registration mode is executed has elapsed.

14. The marine vessel portable device registration method according to claim 13, wherein the receiving of the specific wireless signal includes receiving a signal based on a combination of a lock signal, which is the wireless signal to perform a lock control to lock at least a portion of the marine vessel, and an unlock signal, which is the wireless signal to perform an unlock control to unlock the lock control, as the specific wireless signal.

15. The marine vessel portable device registration method according to claim 14, wherein
the portable device operator of the registered portable device includes a lock operator and an unlock operator separate from each other; and
the receiving of the specific wireless signal includes determining, after having alternately received the lock signal and the unlock signal from the registered portable device based on having alternately performed an input operation on the lock operator and the unlock operator, that the specific wireless signal has been received.

16. The marine vessel portable device registration method according to claim 13, further comprising receiving an operation of entering a password prior to the receiving of the wireless signal from the unregistered portable device; wherein
the receiving of the wireless signal from the unregistered portable device includes receiving the wireless signal from the unregistered portable device when the password that has been entered corresponds to a preset password.

* * * * *